United States Patent
Norgren et al.

(10) Patent No.: US 10,364,190 B2
(45) Date of Patent: Jul. 30, 2019

(54) METHOD OF PRODUCING A COMPONENT OF A COMPOSITE OF DIAMOND AND A BINDER

(71) Applicant: SANDVIK INTELLECTUAL PROPERTY AB, Sandviken (SE)

(72) Inventors: Susanne Norgren, Huddinge (SE); Johan Sundstrom, Stockholm (SE); Malin Martensson, Nacka (SE); Anna Ekmarker, Stockholm (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 15/754,075

(22) PCT Filed: Aug. 25, 2016

(86) PCT No.: PCT/EP2016/070098
§ 371 (c)(1),
(2) Date: Feb. 21, 2018

(87) PCT Pub. No.: WO2017/032841
PCT Pub. Date: Mar. 2, 2017

(65) Prior Publication Data
US 2018/0237346 A1 Aug. 23, 2018

(30) Foreign Application Priority Data
Aug. 26, 2015 (EP) ..................................... 15182544

(51) Int. Cl.
*C04B 35/00* (2006.01)
*B32B 5/16* (2006.01)
(Continued)

(52) U.S. Cl.
CPC ................. *C04B 35/52* (2013.01); *B01J 3/06* (2013.01); *B01J 3/065* (2013.01); *C04B 35/573* (2013.01);
(Continued)

(58) Field of Classification Search
CPC ...... C04B 35/645; C04B 35/653; B01J 3/062; B01J 8/0095; B01J 2203/062;
(Continued)

(56) References Cited

U.S. PATENT DOCUMENTS 4,168,957 A 9/1979 Lee et al.
4,380,471 A * 4/1983 Lee .......................... B01J 3/062
228/121
(Continued)

OTHER PUBLICATIONS

Inlandcraft.com: "Diamond Grit Size Designations, Approximate Particle Sizes, and Counts", Mar. 8, 2011, XP05513951, Retrieved from the Internet: URL:http://www.inlandcraft.com/uguides/lapidary_grit_chart.pdf [retrieved on Oct. 26, 2016] table 1.
(Continued)

*Primary Examiner* — Hoa (Holly) Le
(74) *Attorney, Agent, or Firm* — Corinne R. Gorski

(57) ABSTRACT

A method of producing a component of a composite of diamond and a binder, wherein a Hot Isostatic gas Pressure process (HIP) is used, includes the step of enclosing a de-bound green body having compacted diamond particles in an infiltrant. The method includes the further steps of enclosing the de-bound green body and the infiltrant in a Zr-capsule that has Zirconium as a main constituent and sealing the Zr-capsule, and applying a predetermined pressure-temperature cycle on the unit formed by the de-bound green body, infiltrant and capsule in which the infiltrant
(Continued)

infiltrates the de-bound green body and the de-bound green body is further densified in the sense that the volume thereof is decreased.

15 Claims, 3 Drawing Sheets

(51) Int. Cl.
| | |
|---|---|
| *C04B 35/52* | (2006.01) |
| *C04B 35/573* | (2006.01) |
| *C04B 35/628* | (2006.01) |
| *C04B 35/63* | (2006.01) |
| *C04B 35/634* | (2006.01) |
| *C04B 35/645* | (2006.01) |
| *B01J 3/06* | (2006.01) |

(52) U.S. Cl.
CPC ...... *C04B 35/628* (2013.01); *C04B 35/62823* (2013.01); *C04B 35/634* (2013.01); *C04B 35/6316* (2013.01); *C04B 35/6455* (2013.01); *B01J 2203/062* (2013.01); *B01J 2203/0655* (2013.01); *C04B 2235/3826* (2013.01); *C04B 2235/3834* (2013.01); *C04B 2235/3843* (2013.01); *C04B 2235/3891* (2013.01); *C04B 2235/3895* (2013.01); *C04B 2235/404* (2013.01); *C04B 2235/427* (2013.01); *C04B 2235/428* (2013.01); *C04B 2235/48* (2013.01); *C04B 2235/5427* (2013.01); *C04B 2235/5436* (2013.01); *C04B 2235/5472* (2013.01); *C04B 2235/604* (2013.01); *C04B 2235/608* (2013.01); *C04B 2235/616* (2013.01); *C04B 2235/652* (2013.01); *C04B 2235/656* (2013.01); *C04B 2235/6562* (2013.01); *C04B 2235/77* (2013.01); *C04B 2235/786* (2013.01); *C04B 2235/80* (2013.01); *C04B 2235/85* (2013.01); *C04B 2235/95* (2013.01); *C04B 2235/96* (2013.01); *C04B 2235/9615* (2013.01)

(58) Field of Classification Search
CPC ... B01J 2203/0635; B22F 1/025; B22F 3/004; B22F 7/06; B22F 2201/00
USPC ............ 501/99, 122; 423/446; 428/403, 404
See application file for complete search history.

(56) References Cited

U.S. PATENT DOCUMENTS

| | | | |
|---|---|---|---|
| 4,874,398 A | 10/1989 | Ringwood | |
| 5,010,043 A | 4/1991 | Ringwood | |
| 5,106,393 A | 4/1992 | Ringwood | |
| 6,447,852 B1 * | 9/2002 | Gordeev | ................. C04B 35/52 |
| | | | 264/328.1 |
| 7,008,672 B2 * | 3/2006 | Gordeev | ................. C04B 35/52 |
| | | | 427/249.1 |
| 7,959,841 B2 * | 6/2011 | Zhao | ....................... C04B 35/52 |
| | | | 264/282 |
| 9,657,529 B1 * | 5/2017 | Bertagnolli | ........... E21B 10/567 |
| 2004/0247873 A1 | 12/2004 | Gordeev et al. | |
| 2013/0167447 A1 | 7/2013 | Webb et al. | |

OTHER PUBLICATIONS

Masuro Shimono et al: "HIP-Sinered Composites of C (Diamond)/SiC", Journal of the American Ceramic Society, vol. 87, No. 4, Apr. 1, 2004, pp. 752-755.

* cited by examiner

METHOD OF PRODUCING A COMPONENT OF A COMPOSITE OF DIAMOND AND A BINDER

RELATED APPLICATION DATA

This application is a § 371 National Stage Application of PCT International Application No. PCT/EP2016/070098 filed Aug. 25, 2016 claiming priority to EP 15182544.5 filed Aug. 26, 2015.

TECHNICAL FIELD

The present invention relates to a method of producing a component of a composite of diamond and a binder, wherein a Hot Isostatic gas Pressure process (HIP) is used for solidifying said component.

The produced component is suitable for and may be used in the cutting, turning, drilling and similar working of hard materials, in particular metal or rock. The materials are also suitable in wear parts especially in demanding environment such as acid solutions and/or applications at high temperatures since they are essentially free from metals as Co, Ni and Fe that catalyse the conversion from diamond to graphite.

BACKGROUND OF THE INVENTION

Many different diamond composites have been disclosed in literature, and their advantages as a material for use in the cutting, turning, drilling and similar of hard materials, in particular metal alloys such as steel but also rock and similar materials, have been identified and resulted in the use thereof in such application. Of importance to the performance of the diamond composites is their diamond density which is strongly dependent on the packing of the diamonds and thus also the diamond particle size distribution. Generally, a diamond composite may be referred to as a polycrystalline body possessing substantial abrasiveness and hardness and low or negligible porosity comprised from about 40 percent of volume by diamond crystals. Apart from diamond particles, diamond composites may also comprise a binder, positioned between individual diamond particles in the diamond composite, where it may form a matrix-like structure. A common binder in diamond composites has been silicon carbide, and different methods have been suggested to generate or introduce the silicon carbide into a mass or body of diamond crystals. One such method is referred to as infiltration. Infiltration may be achieved by means of a silicon source that is positioned adjacent to a body of diamond particles and subjected to heat such that it will melt and infiltrate the body of diamond particles. The silicon source may be referred as an infiltrant.

As an alternative, the silicon source may be premixed with the diamond particles before heat is applied to the mass of diamond particles and silicon source thereby formed. In the mass or body of diamond particles the molten silicon source reacts with carbon, either carbon of the diamond particles and/or carbon added to the body specifically for reacting with the silicon source, and forms silicon carbide that will act as a binder in the diamond composite thereby formed. Combinations of use of an infiltrant and premixed silicon source have also been suggested by prior art. In U.S. Pat. No. 7,008,672 B2 using a low pressure infiltration route, the importance of a high heating rate above 1000° C. to avoid a complete graphitisation of the small diamond particles prior to the infiltration is described to be able to achieve a high diamond density and maintain small diamond particles in the sintered parts.

As mentioned above, temperature is one important factor when producing a diamond composite. In order to arrive at a dense diamond composite, a so-called compact, an elevated pressure is also suggested. Elevated density may be achieved in different ways. For example, a mass of polycrystalline diamond particles may be positioned in juxtaposition with a body of silicon. This diamond-silicon assembly is put into a high pressure-high temperature, HPHT, apparatus in which a punch or the like is used for subjecting the diamond-silicon assembly to a very high pressure (for example 15-50 kbar) while, simultaneously, a temperature high enough for melting the infiltrant and causing the above-mentioned reaction between silicon and carbon is applied to the same assembly. Prior art documents, such as U.S. Pat. Nos. 4,874,398, 5,106,393, US 20130167447 and U.S. Pat. No. 5,010,043 all disclose so called HPHT (High Pressure High Temperature) processes in which a very high pressure is applied to a powder or a preform of diamond, followed by the application of an elevated temperature that causes the melting of the infiltrant. A HPHT-process, in general, provides a sintered material with very high diamond content (>70 vol %). However, the problem with HPHT-process, due to the high pressure, is that there is significant limitations in the amount and size of the bodies that may be produced.

Also, there have been suggested manufacturing diamond composites using hot pressing, e.g. U.S. Pat. No. 4,168,957. However, these processes are difficult to adapt for the complex shaped objects in industrial scale.

There has also been suggested by prior art to make use of the so-called Hot Isostatic gas Pressure, HIP, technique in order to apply the heat and pressure required to infiltrate a mass of diamond particles with a an infiltrant and generate the reaction in which the infiltrant forms the requested binder, normally silicon carbide. The use of HIP could be a way of achieving improved production capacity of diamond composite components of rather complicated design, and it is therefore of interest to suggest a HIP process which results in a dense diamond composite component that could be used in applications such as the turning, drilling and cutting of hard materials in general and metals and rock in particular. "HIP-Sintered Composites of C (Diamond)/SiC", by M. Shimono and S. Kume, published in J. Am. Ceram. Soc., 87 (4), 752-55 (2004) discloses a HIP process, in which a mass of diamond particles is premixed with a silicon source with which it is reacted in order to generate a diamond composite component comprising diamond particles and a silicon carbide binder. A capsule made of SiC covered by a glass tube is used, and diamond particles and silicon particles is filled as a mixed powder into the capsule before the application of heat and elevated pressure of the HIP process is initiated. However, the described process does not mention the possibility of using a pre-compacted green body of diamond particles enclosed by a silicon infiltrant and how to possibly adapt the choice of capsule material with regard thereto in order to obtain a denser final component. The use of pre-compacted green bodies instead of loosely packed powder will be of great importance for accomplishment of a more efficient production process in which larger number of components of relatively complicated design can be produced.

The Object of the Invention

One of the aims of the present invention is to provide a method which will overcome or at least reduce the above-mentioned problems. Thus, it is an object of the present invention to present a method that promotes large scale production of diamond composite components which are dense and which may contain a very high relative amount of diamond. It is also an object of the present invention to present a method that makes it possible to produce a sintered high density diamond composite with a large fraction of small diamonds still present despite using a low ramping rate and even applying holding times between 1000° C. and the sintering temperature. By low ramping rate is herein meant approximately 5-15° C./min and at the holding times the ramping rate is 0° C./min whereas as high ramping rate is herein meant >40° C./min.

SUMMARY OF THE INVENTION

The present invention provides a method of producing a component of a composite of diamond content of ≥25 vol % and a binder, wherein a Hot Isostatic Gas Pressure process (HIP) is used, comprising the steps of:
  forming a de-bound green body having a diamond content of solids of at least 50 vol %;
  enclosing said de-bound green body and infiltrant in a Zirconium (Zr)-capsule that comprises zirconium as a main constituent and sealing the Zr-capsule; and
  applying a predetermined pressure-temperature cycle on the unit formed by said de-bound green body, infiltrant and capsule in which the infiltrant infiltrates the de-bound green body and the de-bound green body is further densified in the sense that the volume thereof is decreased wherein the predetermined pressure-temperature cycle comprises a temperature and pressure increase, with or without holding times, until a predetermined maximum temperature being between 1450 to 1600° C. and a predetermined maximum pressure being between 50 to 3000 Bar is reached.

Hence, the present method uses gas pressure to create an isostatic pressure on Zr-capsule and therefore the obtained component will almost have the same form as the green body. Further, the present method will provide for the formation of a dense component as the green body will shrink (about 1 to 4%) almost uniformly in all direction. Additionally, the present process will be easy to adapt to industrial scale.

The choice of zirconium as the capsule material has several advantages. Zirconium has a high melting point, enabling a high temperature to be applied to the infiltrant without causing serious melt-down of the capsule that would enable pressurised gas to reach the not yet completely infiltrated de-bound green body. Moreover, zirconium can be welded in order to seal the capsule before the HIP process is initiated. It may also act as a strong oxygen getter, and once a predetermined temperature has been reached in the de-bound green body-infiltrant assembly, the zirconium capsule may act as a driving force that promotes oxygen bound to the infiltrant and possibly also oxygen bound to the diamond particles to react and pass from the infiltrant and diamond particles either to the zirconium capsule where it forms zirconium oxide or into the molten infiltrant where it may be dissolved or form compounds with, for example, Si or Zr. It is assumed that surface oxides present in the de-bound green body will react with Zr present in the melt during the infiltration. Such removal of oxygen from the infiltrant and the diamond particles will promote a more efficient infiltration due to a lower viscosity of the liquid phase and increased wetting of the diamond surfaces and thereby a denser final product. It may possibly also result in improved bonding between binder and diamond in the final product. As a result of the use of a Zr-based capsule and a relatively high maximum temperature applied during the HIP process, the final product may comprise Zr-based compounds, typically zirconium silicides, therein, that are assumed to have at least some positive effects on the mechanical properties thereof.

Prior to the enclosing of the green body in the infiltrant, a de-bound green body is formed. The de-bound body may be formed by a partial removal of a temporary binder from the green body by subjecting the green body to an elevated temperature. Such a de-bound green body may be referred to as a brown body. However, in the above and the following presentation of the invention, the expression de-bound green body will mostly be used. De-binding may be performed by applying temperatures of >200° C. but <600° C. with a temperature increase increment of 0.5-5 degrees/minute and holding times at critical temperatures to avoid cracking or delamination. The de-binding may be performed at maximum temperatures<500° C. in flowing hydrogen, nitrogen, argon or mixtures thereof with a temperature increase increment of 0.5-5 degrees/minute and holding times at critical temperatures to avoid cracking or delamination. As an alternative, de-binding may be performed by applying maximum temperatures<350° C. in flowing air with a temperature increase increment of 0.5-5 degrees/minute and holding times at critical temperatures to avoid cracking or delamination. The preferred degree of de-bounding of the organic binders in the green is about 90-95% by weight.

The predetermined pressure-temperature cycle can be designed in different ways based on the exact composition of the material, the type and size of HIP equipment and whether or not the green body have been subjected to any other pre-treatment prior to HIP, e.g. CIP (Cold Isostatic Pressing).

More specifically, the predetermined pressure-temperature cycle comprises a temperature and pressure increase, with or without holding times, until the maximum temperature and pressure is reached.

According to one embodiment, the maximum predetermined pressure to be applied during the pressure-temperature cycle may be in the range of 150 to 2500 bar, such as 700 to 3000 bar, such as 700 to 2500 bar, such as 1000 to 2000 bar.

According to one embodiment, the maximum predetermined temperature applied, where the infiltration occurs in the said pressure-temperature cycle, is in the range of 1490-1570° C., such as in the range of 1520-1570° C.

The infiltrant can be any compound comprising one or more of Al, Ti, Zr, Hf, Ge or Si. According to one embodiment, the infiltrant comprises Si as a main constituent. When the infiltrant mainly consists of silicon, the time above 1541° C. (melting point of the Zr-rich Zr—Si eutectium) during the applied temperature-pressure cycle should be less than 7 minutes, preferably less than 5 minutes most preferably less than 3 minutes, to avoid serious melt-down of the zirconium capsule.

According to one embodiment, the maximum temperature is held above the melting point of the silicon rich Zr—Si eutectic at 1361° C. for a predetermined period of time in order to enable partial melting of Zr of the capsule and introduction thereof into the molten infiltrant. The presence of some Zr in the molten infiltrant is assumed to improve oxygen removal therefrom and/or generation of Zr-based compounds in the infiltrant that may have a positive effect on the properties of the final product.

According to one embodiment, the green body is subjected to Cold Isostatic Pressing step prior to de-binding.

Then said pressure-temperature cycle will be possible to perform at a lower maximum pressure, suitably from 50 to 2500 Bar, preferably from 150 to 1500 Bar, most preferably 150 to 1100 Bar. The maximum temperature is suitably from 1490 to 1570° C., preferably from 1510 to 1560° C.

In one embodiment, when the green body is subjected to Cold Isostatic Pressing step prior to de-binding, no holding time is present, i.e. the pressure and temperature is increased concurrently until the maximum temperature and maximum pressure is reached.

According to one embodiment, said pressure-temperature cycle comprises a first step in which the temperature is increased to a predetermined temperature at which oxygen bound to the infiltrant undergoes a reaction and is removed at least from surfaces of the infiltrant. It is assumed that at least some oxygen passes through the infiltrant to the Zr-capsule, where it reacts with Zr of the Zr-capsule to form zirconium oxide. It may also form compounds, for example with Zr, in the infiltrant that are less harmful to the wetting of the diamond particles by the molten infiltrant. As mentioned above, removal of oxygen from the infiltrant may promote an improved final product. The predetermined temperature is suitably between 1100 to 1361° C., preferably 1200 to 1361° C., more preferably 1280 to 1350° C. The eutecticum of the Si-rich melt is 1361° C.

According to yet another embodiment, in a second step, the pressure is increased to a level of at least, 40%, or at least 50%, or at least 75% of the maximum pressure to be applied during said pressure-temperature cycle, and not until after said pressure has been reached, the temperature is increased to a level at which the infiltrant melts and is able to infiltrate the de-bound green body. The applied pressure in connection to said temperature increase promotes a more efficient and rapid infiltration and densification of the green body. There is suggested to apply one or several holding times in the said temperature-pressure cycle below the melting point of the infiltrant or any possible Zr-infiltrant melt, wherein the temperature is kept constant at suitably between 1100 to 1361° C., preferably 1200 to 1361° C., more preferably 1280 to 1350° C. The eutecticum of the Si-rich melt is 1361° C. and the pressure increase is between 5-30 bar/min, or 10-30 bar/min, or 15-25 bar/min. These holding times may be in the range of 10-90 minutes, more preferable 15-80 minutes, and most preferable 20-60 minutes. During the last holding time 40-95% of the maximum pressure is reached, more preferable 60-95%, most preferable 70-90% and not until after said pressure has been reached, the temperature is increased to a level at which the infiltrant melts and is able to infiltrate the green body.

In one embodiment of the present invention, the predetermined temperature pressure cycle starts with a pressure increase to a pressure being suitably between 35 to 45 Bar, after which the temperature is increased to a temperature suitably being between 1250 to 1350° C. The temperature is then kept constant for a period of between 40 to 60 minutes during which the pressure is increased suitably to 950 to 1050 Bar is reached. After that, both the temperature and pressure are increased to 1550 to 1570° C. and 950 to 1150 Bar respectively.

According to a further embodiment, in said first step, the pressure is kept below a predetermined level, such that the infiltrant will maintain an open porosity that permits the oxygen-based gas to pass through the infiltrant as a gaseous phase to the Zr-capsule, which acts as an oxygen getter. Thereby, a more rapid and efficient removal of oxygen from the infiltrant is achieved.

According to yet another embodiment, the predetermined temperature is held for a predetermined period of time in order to allow at least 50%, preferably at least 70%, even more preferably at least 90% of the oxygen initially bound to the infiltrant to transfer to the Zr-capsule and form zirconium oxide.

According to another embodiment, said pressure-temperature cycle comprises a first step in which the temperature is increased to a level at which oxygen bound to the diamond particles of the de-bound green body undergoes a reaction and is removed from at least surfaces of the diamond particles. It is assumed that at least some of the removed oxygen passes through the infiltrant to the Zr-capsule, where it reacts with Zr of the Zr-capsule to form zirconium oxide. It may also form compounds, for example with Zr, in the infiltrant that are less harmful to the wetting of the diamond particles by the molten infiltrant. As mentioned above, removal of oxygen from the diamond particles of the de-bound green body will promote a more efficient infiltration and thereby an improved final product. The preferable level to which the temperature is increased in said first step is in a range from approximately 500° C. to below 1361° C., the eutecticum of the Si-rich melt, more preferably from 600° C. to below 1361° C., even more preferably from approximately 700° C. to 1350° C.

According to one embodiment, the predetermined temperature is held for a predetermined period of time in order to allow at least 25%, or at least 50%, or at least 70%, or at least 80%, of the oxygen initially bound to the diamond particles of the green body to transfer to the Zr-capsule and form zirconium oxide.

According to one embodiment, the maximum temperature applied and length of time of application thereof is delimited such that pressurised gas used for applying said gas pressure does not penetrate the Zr-capsule prior to completed infiltration of the de-bound green body by the infiltrant. This being said, it should be noted that the applied heat may be such that it actually results in a slow melt down of the zirconium capsule, but that the heat and the thickness of the capsule are adapted such that no pressurised gas is able to penetrate the capsule before completed infiltration of the green body. The zirconium capsule wall thickness may be in the range of 2-6 mm, preferable 2-4 mm, most preferably 2.4-2.8 mm for a preferred pressure-temperature cycle in which silicon is used as the infiltrant. An inert gas is suggested for the purpose of applying an isostatic pressure on the capsule during the pressure-temperature cycle of the HIP process. According to one embodiment, said gas is argon.

According to one embodiment, the diamond particles of the green body have a particle size in the range of between 0.5 to 200 microns, preferably between 1 to 150 microns and more preferably between 2 to 100 microns. The diamond particles may be present in bi-modular or multi-modular size distributions.

The green body comprises diamond particles and organic binder(s), i.e. it must not consist of diamond particles solely. Furthermore, the green body may also, as an example, comprise additions of other refractory carbides, for example WC, $W_2C$, SiC, $B_4C$, TiC, TaC, NbC, $Cr_3C_2$, $Ti_3SiC_2$ or carbide forming metals, such as W, Al, Cr, Mo, Zr or other carbon sources such as carbon fibres or graphene. Sub-stoichiometric carbides may also be present.

According to one embodiment, the green body may be produced from a granulated powder by conventional compaction techniques. The green body may be additionally densified by being subjected to CIP (Cold Isostatic Pressing).

According to one embodiment, the infiltrant, that encloses the de-bound green body, comprises a densely packed powder and/or granules with bimodal or multimodal particle size distribution or as a dense replica of the brown bodies and the capsule. The density of the infiltrant in the capsule prior to sintering is suitably >30%, preferably between 40 to 99%, and more preferably between 50 to 90% of its theoretical sintered density. The theoretical sintered density is the tabulated sintered density of the infiltrant.

According to the present invention, the diamond content of the solids in the de-bound green body is at least 50 vol %, preferably at least 60 vol %, most preferably at least 70 vol %.

It should also be mentioned that the pressure-temperature cycle is set such that the de-bound green body will be fully infiltrated and sintered and the shape of the green body will be maintained during the process. Furthermore, as a general rule, the melting point of the infiltrant should be significantly lower than the melting point of the capsule. The thickness of the capsule is thin enough to transmit the isostatic gas pressure but thick enough to not completely alloy and melt through during the process. The capsule should maintain sealed during the infiltration, and the major part of the pressure should be applied prior to the infiltration.

The present invention also relates to a sintered diamond composite having a diamond content of ≥25 vol % made according to the method described hereinabove or hereinafter.

The Zr-content in the sintered diamond composite may be preferably in the range of 1.5 to 8.5 wt %, more preferably in the range of 2.5 to 7.5 wt %, most preferably in the range of 3.5 to 6.5 wt %. The Zr-distribution within the sintered body is not homogenous.

Other constituents that can be present in the sintered diamond composite is one or more elements selected from Si, Ge, Ti, W, Hf, Ta, Nb, Al, Cr, Mo and V.

In another embodiment of the present invention, the area % of diamond in the sintered diamond composite is suitably above 40, preferably above 45. By area % is herein meant the total area of the micrograph identified as diamond phase in percentage of total micrograph area, see also example 15.

In one embodiment of the present invention, the number of fines (NF) should suitably be >15%, preferably >25% and more preferably >35% higher compared to the NF of the corresponding material sintered according to U.S. Pat. No. 7,008,672 (see also example 9) when starting from the same DPSD in the raw material.

Depending on the DPSD in the raw material, the finest diamond fraction will vary in both average size and distribution. In the sintered material, the number of diamond particles is measured by image analysis as described in example 17 below.

In one embodiment, the sintered diamond composite have a B3B strength at 63.2% failure probability of suitably >675 MPa, preferably >700 MPa and most preferably >725 MPa.

EXAMPLES

Example 1—HIP at 1125 Bar and 1570° C.

Diamond powders were dry blended together to form a uniform mixture. The diamond was a mixture of 80 wt % 20 to 30 micron and 20 wt % 4 to 8 micron diamond of grade MBM from Diamond Innovations Inc, this diamond blend is hereafter referred to as DPSD 1. Homogenous slurry was prepared using this mixture and then adding PEG1500 and PEG4000 as temporary organic binders, with de-ionized water as the fluid. The slurry was spray granulated to produce granules for pressing and the amount of organic binders in the powder was 9.26 wt % which corresponds to 23 vol %.

Granules were used in uni-axial pressing of green bodies in the shape of tool tips (buttons) typically used in mining operations (rock drilling) to a green density as high as possible with the used compaction technique. The force applied for the compaction of the green bodies was typically 40-50 kN. The relative diamond density in the green bodies was around 60%. The relative diamond density in percentage was calculated as the mass of diamonds in the green body (temporary organic binders and other additions excluded) divided by the volume of the green body obtained from the press tool drawing divided by the X-ray density of diamonds (3.52 g/cm$^3$), multiplied by 100. Depending on the compaction technique and the shape of the body the density can vary slightly between different parts of the green body. The green bodies were slowly heated in the presence of air to partially remove the PEG to create a brown body 1 (de-bound green body) of enough strength for further handling. The weight of a representative green body was 7.651 g and 6.962 g after de-binding.

Figure 1:
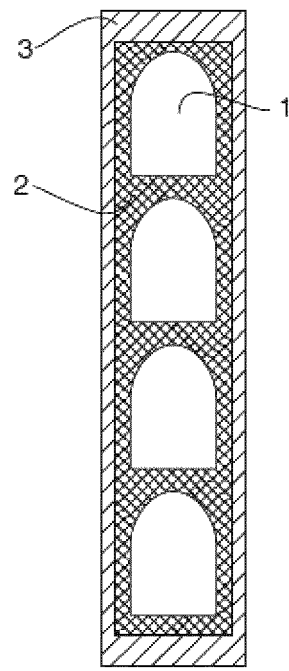
FIG. 1 discloses a cross-section of a test set up consisting of a number of de-bound green bodies surrounded by a silicon-based infiltrant and a Zirconium-based capsule.

As shown in FIG. 1 four brown bodies 1 were placed in a Zr-capsule 3 with a sealed bottom and with a dense packed silicon powder blend 2 completely surrounding the brown bodies 1. The Zirconium capsule 3 was manufactured from a tube in the commercial Sandvik grade Zr 702 with a purity of ≥92.2 wt % and with Hf-content of ≤4.5 wt %. The dimensions of the capsule 3 were; outer diameter OD~25.4 mm, inner diameter ID~20.2 mm, wall thickness 2.6 mm, and height 130 mm, giving a capsule weight of 185 g. The capsule material had a melting point of 1852° C. The Si-powder blend 2 was a mixture of 86 wt % Silgrain® coarse from Elkem with a purity of 99.5 wt % and with an oxygen content of 0.119 wt % analyzed by LECO and grain size of 0.2-0.8 mm and Silgrain HQ from Elkem with a purity of 98% and with an oxygen content of 0.059 wt % analyzed by LECO and a grain size between 20-300 microns. The tap density of this Si-blend 2 is about 1.36 g/cm$^3$, measured by filling a calibrated volume (Ford cup) with the Si-powder blend during subsequent manual tapping of the Ford cup the same way as performed during the filling of the capsules and then measuring the weight, which corresponds to about 58% of the theoretical sintered density of silicon. After filling the capsule 3, it was sealed by welding. The total amount of Si added to the capsule 3 was 35 g and the total weight of the brown bodies 1 was 28 g.

Figure 2:
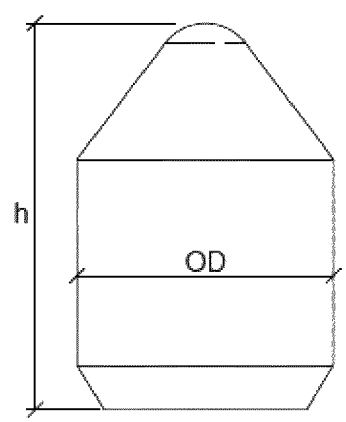
FIG. 2 discloses a side view of a sintered component obtained from the setup shown in FIG. 1, more precisely a light optical microscope image of a sintered insert, in which the geometry referred to in the examples and in the image the top of the insert is indicated and also where the outer diameter OD and height h, respectively, are measured.

The sealed capsules 3 were arranged in a HIP furnace. The temperature was increased to 400° C. under vacuum. After a 30 min hold time at 400° C., the argon gas pressure was rapidly raised to 40 Bar and then the temperature was increased with 16°/min to 1300° C. At 1300° C. the pressure was increased to 1000 bar during roughly 55 minutes at constant temperature followed by a concurrent temperature and pressure increment until the maximum sintering temperature 1570° C. and the maximum pressure of 1125 Bar was reached after 20 min. The capsules 3 were then allowed to cool down freely during pressure release. After 15 min. the temperature was below 1000° C. and the pressure was about 800 Bar. After totally 1 hour of cooling, the temperature was about 200 degrees C. and the HIP furnace was opened. After HIP, the Zr-capsule was slightly distorted and had shrunk but was still sealed. The capsule 3 was put in an pickling bath containing 2% HF and 20% HNO$_3$ in an aqueous solution for about 24 hours to remove the Zr-capsule and partly also the Si-residuals surrounding the inserts. After the acid treatment a final cleaning was performed using a grit blaster with SiC grit. The SiC grit removed Si and zirconium silicides from the sintered body but did not abrade the body itself, indicating that the body was well sintered and has a very high hardness and abrasion resistance. The cleaned sintered article is shown in FIG. 2, which shows a light optical microscope image of a sintered insert 4 having the geometry referred to in the examples. In the image, the top of the insert is indicated and also where the outer diameter OD and height h, respectively, are measured.

The densities of the HIP sintered bodies were measured using Archimedes' method and were between 3.50-3.52 g/cm$^3$, se table 1.

TABLE 1

| Sample No. | mass green body (g) | mass brown body (g) | mass sintered (g) | mass increase (%) | Volume sintered (cm$^3$) | Sintered density Archimedes (g/cm$^3$) |
|---|---|---|---|---|---|---|
| 1a | 7.651 | 6.962 | 11.177 | 60.54 | 3.180 | 3.510 |
| 1b | 7.733 | 7.027 | 11.062 | 57.42 | 3.154 | 3.503 |
| 1c | NA | 6.963 | 11.144 | 60.05 | 3.180 | 3.505 |
| 1d | NA | 7.123 | 11.328 | 59.03 | 3.225 | 3.509 |

The dimensions outer diameter (OD) and height (h) of the sintered bodies was measured as shown in FIG. 2. The dimensions had decreased compared with the pressed green bodies, see table 2.

TABLE 2

| Sample No. | Nominal OD green (mm) | OD sintered (mm) | OD shrinkage (%) | Height green (mm) | Height sintered (mm) | Height shrinkage (%) |
|---|---|---|---|---|---|---|
| 1a | 15.95 | 15.620 | 2.22 | 22.297 | 21.611 | 3.08 |
| 1b | 15.95 | 15.684 | 2.00 | 21.958 | 21.426 | 2.42 |
| 1c | 15.95 | 15.644 | 2.27 | 22.182 | 21.534 | 2.92 |
| 1d | 15.95 | 15.692 | 2.00 | 22.276 | 21.923 | 1.58 |

Phase analysis performed using XRD (CuKα-radiation). The diffractograms were collected with a PanAnalytical X'PertPro diffractometer from 20-90 degrees in 2θ on a flat ground and polished area from the top of the samples as shown in FIG. 2. The High Score+ software was used for the evaluation (phase identification) and in all samples diamond, SiC (β-Moissanite) and ZrSi$_2$ were found. All diffraction peaks could be indexed. Some samples also showed the presence of other zirconium silicides, ZrC, residual Si and in some cases possible traces of zirconium oxides and in these cases only the first to third strongest line(s) could be detected.

The bodies were CT-scanned for defect detection but were found to not contain any pores or cracks larger than 3 times the voxel size. By CT it was also clearly seen that the Zr-distribution within the body is not homogenous.

The CT-system used for these scans were a v|tome|x s240 from GE Sensing and Inspection Technologies, using the following settings:

| | |
|---|---|
| Magnification | 9.1 |
| Voxelsize (Resolution) | 22 μm |
| X-ray voltage | 80 kV |
| X-ray current | 270 μA |
| X-ray filter (Cu) | 0.1 mm |
| Detector timing | 200 ms |
| Detector averaging | 3 |
| Detector skip | 1 |
| Detector sensitivity | 4 |
| Number of projections | 1200 |

After the CT scans were completed, the projections were reconstructed using datos|x 2.0 from GE Sensing and Inspection Technologies, and then analyzed with Volume Graphics StudioMax 2.1.

Example 2—HIP at 1000 Bar and 1520° C.

Green bodies were prepared and de-bound (brown bodies) as in example 1. Also the capsule and the Si blend are the same as used in example 1. The total amount of Si added to the capsule was 36 g and the total weight of the brown bodies was 29 g. The temperature was increased to 400° C. under vacuum. After a 30 min hold time at 400° C., the argon gas pressure was raised to 40 Bar. Then the temperature was increased with 16°/min to 1300° C. At 1300 C the pressure was increased from 40 Bar to 1000 bar during 55 minutes at a constant temperature followed by a temperature increase of 11° C./min to the maximum sintering temperature and pressure of 1520° C. and 1000 Bar. The capsules were then allowed to cool down freely with a constant pressure release. After 15 min the temperature was about 800° C. and the pressure was about 730 Bar. After 70 minutes cooling, the temperature was about 200 degrees C. and the HIP furnace was opened.

After HIP, the Zr-capsule was slightly distorted and had shrunk but was still sealed. The capsules was put in an acid bath containing HF(aq) for about 24 h to remove the Zr-capsule and partly also the Si-residuals surrounding the inserts. After the acid treatment a final cleaning was performed using a grit blaster with SiC grit. The SiC grit removed Si and zirconium silicides from the sintered body but did not abrade the body itself, indicating that the body was well sintered and has a very high hardness and abrasion resistance. The densities of the HIP sintered bodies were measured using Archimedes' method and were between 3.50-3.52 g/cm$^3$ as shown in table 3. The dimensions were also measured and the OD and height of the sintered bodies had decreased compared with the pressed green bodies, see table 3.

TABLE 3

| Sample No. | Mass green (g) | mass brown (g) | mass sintered (g) | mass increase (%) | Volume sintered (cm$^3$) | Sintered density Archimedes (g/cm$^3$) |
|---|---|---|---|---|---|---|
| 2a | 7.959 | 7.267 | 11.357 | 56.28 | 3.234 | 3.512 |
| 2b | 7.938 | 7.246 | 11.369 | 56.90 | 3.253 | 3.495 |
| 2c | 7.912 | 7.224 | 11.46 | 58.64 | 3.259 | 3.517 |
| 2d | 7.87 | 7.194 | 11.458 | 59.27 | 3.256 | 3.519 |

| Sample No. | Nominal OD green (mm) | OD sintered (mm) | OD shrinkage (%) | Height green (mm) | Height sintered (mm) | Height shrinkage (%) |
|---|---|---|---|---|---|---|
| 2a | 15.90 | 15.640 | 1.64 | 22.47 | 21.974 | 2.21 |
| 2b | 15.90 | 15.654 | 1.55 | 22.46 | 21.984 | 2.12 |
| 2c | 15.90 | 15.662 | 1.50 | 22.44 | 22.044 | 1.76 |
| 2d | 15.90 | 15.663 | 1.49 | 22.43 | 22.064 | 1.63 |

Example 3—HIP at 1130 Bar and 1570° C.

Diamond powders were weighed and dry blended together to form a uniform mixture according to DPSD 1. Slurry and greens were prepared as described in Example 1. Four brown bodies were placed in a Zr-capsule with a sealed bottom and with a dense packed silicon powder blend completely surrounding the brown bodies as shown in FIG. 1. The Zirconium capsule was manufactured as described in Example 1. The Si-powder blend was a mixture of 96 wt % Silgrain® coarse from Elkem with a purity of 99.5 wt % and with an oxygen content of 0.119 wt % analyzed by LECO and 4 wt % of a graphite powder with a purity of 98% and a particle size<75 microns. The graphite was added to decrease and steer the amount of liquid Si but maintaining the amount of pressurizing media. After filling the capsule, it was sealed by welding. The total amount of Si—C blend added to the capsule was 34 g. The sealed capsules were placed in the HIP furnace, and the furnace was run according to the cycle described in example 1. However, the measured maximum pressure was close to 1130 bar (compared to 1125 in example 1). The HIP was cooled for 80 minutes to about 100° C. before opening the furnace. After HIP, the Zr-capsule was slightly distorted and had shrunk but was still sealed. The capsule was removed by turning followed by a final cleaning using a grit blaster with SiC grit. The SiC grit removed silicon, silicon carbide and zirconium silicides from the sintered body but did not abrade the body itself, indicating that the body was well sintered and has a very high hardness and abrasion resistance. The densities of the HIP sintered bodies were measured using Archimedes' method and were between 3.49-3.50 g/cm$^3$, se table 4.

TABLE 4

| Sample No. | m brown (g) | m sintered (g) | m increase (%) | V sintered (cm$^3$) | Sintered density Archimedes (g/cm$^3$) |
|---|---|---|---|---|---|
| 3a | 7.378 | 11.407 | 54.608 | 3.288 | 3.496 |
| 3b | 7.561 | 11.492 | 51.99 | 3.287 | 3.496 |
| 3c | 7.468 | 11.465 | 53.522 | 3.283 | 3.492 |
| 3d | 7.56 | 11.472 | 51.746 | 3.285 | 3.492 |

The dimensions (outer diameter (OD) and height (h)) of one sintered body (No 3b) was measured as shown in table 5.

TABLE 5

| Sample No. | Nominal OD green (mm) | OD sintered (mm) | OD shrinkage (%) | h green (mm) | h sintered (mm) | h shrinkage (%) |
|---|---|---|---|---|---|---|
| 3b | 15.90 | 15.771 | 0.81 | 22.43 | 22.057 | 1.66 |

Example 4—HIP at 1135 Bar and 1570° C.

Diamond powders were dry blended together to form a uniform mixture. The diamond mixture was a multi-modal mixture of MBM-diamonds from Diamond Innovation with particle sizes in the range of 6 to 80 μm, which gives a high density during compaction. This diamond blend will hereafter be referred to as DPSD 2. A homogenous slurry was prepared using this mixture and then adding 22.9 vol. % PEG1500 and PEG4000 as organic binders, with de-ionized water as the fluid. The slurry was spray granulated to produce granules for pressing and the amount of organic binders in the powder was 9.26 wt % which corresponds to 23 vol %. Granules were used in uni-axial pressing of green bodies in the shape of tool tips typically used in mining operations to a green density as high as possible with the used compaction technique. The pressing pressures were about 30 kN and the relative diamond density in the green bodies was around 66%. The green bodies were slowly heated in the presence of air to partially remove the PEG to create a brown body of enough strength for further handling. The weight of the green body was 8.432 g, and the weight of the brown body was 7.724 g.

The brown body was placed in a Zr-capsule with a sealed bottom together with two other brown bodies, one of which was as described in examples 1 and 2, and with a dense packed silicon powder blend according to example 1 completely surrounding the brown bodies. The Zirconium capsule were manufactured as described in example 1. After filling the capsule, it was sealed by welding. The total amount of Si added to the capsule was 38 g and the total weight of the brown bodies was 24 g. The temperature was increased to 400° C. under vacuum. After a 30 min hold time at 400° C., the argon gas pressure was raised to 40 Bar. The temperature was then increased with 16°/min to 1300° C. At 1300° C. the pressure was increased from 40 Bar to 1000 bar during 45 minutes keeping the temperature constant followed by a temperature increase of 13.5° C./min to the maximum sintering temperature and pressure of 1567° C. and 1135 Bar. The capsule was then allowed to cool down freely with a constant pressure release. After 11 min the temperature was just below 1000° C. and the pressure was about 820 Bar. After about 40 minutes of cooling, the temperature was about 200° C. and the HIP furnace was opened.

After HIP, the Zr-capsule was slightly distorted and had shrunk but was still sealed. The capsule was removed by a turning operation followed by a grit blasting process with SiC grit. The SiC grit removed silicon and zirconium silicides from the sintered body but did not abrade the body itself, indicating that the body was well sintered and has a very high hardness and abrasion resistance. The density of the HIP sintered body was measured using Archimedes' method and was 3.504 g/cm$^3$.

The dimensions were also measured and the outer diameter (OD) after sintering was 15.73 mm and the nominal ID (inner diameter) of the press tool was 15.95 mm which corresponds to 1.4% OD-shrinkage during sintering.

Example 5—HIP at 1135 Bar and 1570° C.

Diamond powders were weighed and dry blended together to form a uniform mixture according to DPSD 2. A slurry and granulated powder was prepared as in Example 4. Granules were used in uni-axial pressing of green bodies in the shape of tool tips typically used in mining operations to a green density as high as possible with the used compaction technique. The relative diamond density in the green bodies was around 66%. The green bodies were slowly heated in the presence of air to remove the PEG partially to create brown bodies of enough strength for further handling. The weight of the green body was 8.553 g, and the weight of the brown body was 7.842 g. The brown body was placed in a Zr-capsule with a sealed bottom together with two other brown bodies, one of which was as described in examples 1 and 2, and with a dense packed silicon powder blend completely surrounding the brown bodies. The Zirconium capsule was manufactured as described in example 1. The Si-powder blend was a mixture of 96 wt % Silgrain® coarse from Elkem with a purity of 99.5 wt % and with an oxygen content of 0.119 wt % analyzed by LECO and 4 wt % of a fine graphite powder with a purity of 98%. The graphite was added to decrease and steer the amount of liquid Si but maintaining the amount of pressurizing media. After filling the capsules it was sealed by welding. The total amount of Si—C blend added to the capsule was 39.5 g and the weight of the brown bodies was 24 g.

The capsule was placed in a HIP furnace, which was run as described in example 4, maximum temperature and pressure were 1567° C. and 1135 bar.

After HIP, the Zr-capsule was slightly distorted and had shrunk but was still sealed. The capsule was removed by a turning operation followed by a grit blasting process with SiC grit. The SiC grit removed silicon and zirconium silicides from the sintered body but did not abrade the body itself, indicating that the body was well sintered and has a very high hardness and abrasion resistance. The density of the HIP sintered body was measured using Archimedes' method and was 3.498 g/cm$^3$. The dimensions were also measured and the outer diameter (OD) after sintering was 15.75 mm and the nominal ID of the press tool was 15.95 mm which corresponds to 1.3% OD-shrinkage during sintering.

Example 6—HIP at 1130 Bar and 1570° C., Ti$_3$SiC$_2$ Added

Diamond powders were dry blended together with a well de-agglomerated Ti$_3$SiC$_2$ powder to form a uniform mixture. The powder mixture contained 82 wt % of MBM-diamonds from Diamond Innovations with the DSPD 2 diamond particle size distribution, and 18 wt % of Ti$_3$SiC$_2$. Homogenous slurry was prepared using this mixture and then adding PEG1500 and PEG4000 as temporary organic binders and Dispex A40 as a dispersant agent for Ti$_3$SiC$_2$, with de-ionized water as the fluid. The slurry was spray granulated to produce granules for pressing and the amount of organic binders in the powder was 9.26 wt % corresponding to 23.6 vol %.

Granules were used in uniaxial pressing of green bodies in the shape of tool tips typically used in mining operations to a high green density with the used compaction technique (20 kN). The relative diamond density in the green bodies was 55%+/−0.5%. The green bodies were slowly heated in the presence of air to partially remove the PEG to create a brown body of enough strength for further handling, see details in table 6.

Four brown bodies were placed in a Zr-capsule with a sealed bottom and with a densely packed silicon powder blend completely surrounding the brown bodies as shown in FIG. 1. The Zirconium capsule and Si blend were prepared as described in example 1. After filling the capsule, it was sealed by welding. The total amount of Si added inside the capsule was 31.5 g and the total weight of the brown bodies was 33 g.

The capsule was placed in the same HIP-charge as the capsule described in Example 3, and thus subjected to the same HIP-process.

After HIP, the Zr-capsule was slightly distorted and had shrunk but was still sealed. The capsule was removed by a turning operation followed by a grit blasting process with SiC grit. The SiC grit removed silicon, silicon carbide and zirconium silicides from the sintered body but did not abrade the body itself, indicating that the body was well sintered and has a very high hardness and abrasion resistance. The volume and densities of the HIP sintered bodies were measured using Archimedes' method and the densities were between 3.59-3.60 g/cm$^3$, se table 6.

TABLE 6

| Sample No. | m green body (g) | m brown body (g) | m sintered (g) | Mass increase (%) | Sintered volume (cm³) | Sintered density Archimedes (g/cm³) |
|---|---|---|---|---|---|---|
| 6a | 8.901 | 8.151 | 10.686 | 31.1 | 2.974 | 3.593 |
| 6b | 8.913 | 8.162 | 10.831 | 32.7 | 3.014 | 3.593 |
| 6c | 8.903 | 8.156 | 10.839 | 32.9 | 3.011 | 3.600 |
| 6d | 8.891 | 8.144 | 10.783 | 32.4 | 2.995 | 3.600 |

| Sample No. | Nominal OD green (mm) | OD sintered (mm) | OD shrinkage (%) | Height green (mm) | Height sintered (mm) | Height shrinkage (%) |
|---|---|---|---|---|---|---|
| 6a | 15.90 | 15.362 | 3.38 | 22.016 | 21.158 | 3.90 |
| 6b | 15.90 | 15.390 | 3.21 | 22.027 | 21.263 | 3.47 |
| 6c | 15.90 | 15.406 | 3.11 | 22.016 | 21.253 | 3.47 |
| 6d | 15.90 | 15.352 | 3.45 | 22.029 | na | na | with 9.5°/min to the maximum temperature of 1558° C. with the argon pressure was concurrently raised to 150 bar. The capsules were then allowed to cool down freely with a constant pressure release. After 18 min the temperature was below 1000° C. and the pressure was about 110 Bar. After 2.5 hours of cooling the temperature was below 100 degrees C. and the HIP furnace was opened.

After HIP, the Zr-capsule was slightly distorted and had shrunk but was still sealed. The capsules was put in an acid bath containing HF(aq) for about 24 h to remove the Zr-capsule and partly also the Si-residuals surrounding the inserts. After the acid treatment a final cleaning was performed using a grit blaster with SiC grit. The SiC grit removed silicon and zirconium silicides from the sintered body but did not abrade the body itself, indicating that the body was well sintered and has a very high hardness and abrasion resistance. The volume and density of the HIP sintered bodies was determined by Archimedes' method.

The dimensions were also measured and the outer diameter (OD) after sintering the nominal ID of the press tool was 15.95 mm (see table 7).

TABLE 7

| Sample No. | m green (g) | m brown (g) | m sintered (g) | m increase (%) | V sintered (cm³) | Sintered density Archimedes (g/cm) |
|---|---|---|---|---|---|---|
| 7a | 7.745 | 7.057 | 11.191 | 58.58 | 3.182 | 3.513 |
| 7b | 7.849 | 7.142 | 11.263 | 57.70 | 3.206 | 3.509 |
| 7c | 7.852 | 7.148 | 11.203 | 56.73 | 3.188 | 3.51 |
| 7d | 7.856 | 7.148 | 11.198 | 56.66 | 3.187 | 3.51 |

| Sample No. | OD pressed (mm) | OD sintered (mm) | OD shrinkage (%) | h pressed (mm) | h de-bound (mm) | h sintered (mm) | h shrinkage (%) |
|---|---|---|---|---|---|---|---|
| 7a | nom 15.95 | 15.689 | 1.67 | 21.904 | 21.939 | 21.81 | 0.43 |
| 7b | nom 15.95 | 15.82 | 1.03 | 21.960 | 21.96 | 21.803 | 0.71 |
| 7c | nom 15.95 | 15.761 | 1.41 | 21.866 | 21.859 | 21.776 | 0.41 |
| 7d | nom 15.95 | 15.796 | 1.23 | 21.850 | 21.818 | 21.649 | 0.92 |

Example 7—HIP at 150 Bar 1560° C.

Samples were prepared as in example 1 disclosed above. Capsule and Si blend are in accordance with description in example 1. The capsule, containing the de-bound green bodies (brown bodies) were positioned in a furnace and subjected to the following HIP-process:

The temperature was increased to 400° C. under vacuum. After a 30 min hold time at 400° C., the argon gas pressure was raised to 40 Bar. The temperature was then increased Example 8—HIP at 150 Bar and 1560° C.

The same pressure-temperature cycle as previously disclosed in Ex. 7 for HIP at 150 Bar and 1560° C. was applied to samples corresponding to those of Ex. 7 but the greens were pre-treated by cold isostatic pressing (CIP) before de-binding. The test showed that pretreatment by means of cold isostatic pressing before de-bounding did not prevent further shrink during the HIP process and full infiltration. The test resulted in approximately the same density as in example 7, but a slightly smaller volume after sintering.

TABLE 8

| Sample No. | m pressed | m de-bound (g) | m sintered (g) | m increase (%) | V sintered (cm³) | Sintered density Archimedes (g/cm³) |
|---|---|---|---|---|---|---|
| 8a | 7.663 | 6.948 | 10.958 | 57.71 | 3.118 | 3.51 |
| 8b | 7.808 | 7.11 | 11.124 | 56.46 | 3.166 | 3.51 |
| 8c | 7.855 | 7.152 | 11.16 | 56.04 | 3.176 | 3.51 |
| 8d | 7.877 | 7.172 | 11.195 | 56.09 | 3.193 | 3.502 |

TABLE 8-continued

| Sample No. | OD pressed (mm) | OD sintered (mm) | OD shrinkage (%) | h pressed (mm) | h de-bound (mm) | h sintered (mm) | h shrinkage (%) |
|---|---|---|---|---|---|---|---|
| 8a | nom 15.95 | 15.726 | 1.40 | 21.803 | nm | 21.53 | 1.25 |
| 8b | nom 15.95 | 15.755 | 1.22 | 21.856 | nm | 21.702 | 0.70 |
| 8c | nom 15.95 | 15.753 | 1.24 | 21.86 | nm | 21.658 | 0.92 |
| 8d | nom 15.95 | 15.728 | 1.39 | 21.86 | nm | na | na |

Example 9, Prior Art—Low Pressure Sintering—Infiltration in Vacuum at 1650° C.

Diamond brown bodies from the same batch as in Ex. 1 were placed in hBN-coated graphite crucibles with silicon lumps in a large access (200% in weight) placed in the bottom of the crucible. The silicon was Silicon 99 Refined-Si 30 015 from Elkem with a silicon content of 99.4 wt % and oxygen content of 0.004% analyzed by LECO and a with a particle size of 10-100 mm. The infiltration was performed under vacuum to the maximum temperature of 1650° C. as has been described in U.S. Pat. No. 7,008,672 B2. A fast temperature ramping, 50° C./min, was applied above 1000° C. to prevent extensive graphitization (>/=50 wt %) of the diamonds prior to Si-infiltration. The temperature was maintained for about 10 min and the samples were than cooled down freely. The access silicon was removed by SiC-grit blasting and the body inspected by Computer Tomography. No pores>3× the voxel size of 17 microns could be detected. The sintered density was 3.316 g/cm³. The sintered OD were 15.981 mm compared with the nominal dimensions of the press tool ID of 15.95 mm, which corresponds to an OD increase of 0.2%. Diffraction data were collected between 15-70 degrees in 2 theta on the top of an sintered and as-blasted insert using a Bruker D8 (Gadds) with CuKα-radiation and a 0.5 mm collimator. The High Score+ software was used for the evaluation (phase identification) and diamond, SiC (β-Moissanite) and Si were found.

TABLE 9

| m green body (g) | m brown body (g) | m sintered (g) | Sintered volume (cm³) | Sintered density Archimedes (g/cm³) |
|---|---|---|---|---|
| 7.726 | 7.150 | 11.068 | 3.336 | 3.316 |

Example 10, Prior Art—Low Pressure Sintering—Infiltration in Vacuum at 1650° C.

Diamond brown bodies from the same batch as in Ex. 4 were placed in hBN-coated graphite crucibles with silicon lumps in a large access (200% in weight) placed in the bottom of the crucible. The silicon used was Silicon 99 Refined-Si 30 015 from Elkem with a silicon content of 99.4 wt % and oxygen content of 0.004% analyzed by LECO and a with a particle size of 10-100 mm. The infiltration was performed under vacuum to the maximum temperature of 1650° C. as has been described in U.S. Pat. No. 7,008,672 B2. A fast temperature ramping, 50° C./min, was applied above 1000° C. to prevent major graphitization (>/=50 wt %) of the diamonds prior to Si-infiltration. The temperature was maintained for about 10 minutes and the samples were than cooled down freely. The excess silicon was removed by SiC-grit blasting and the body inspected by Computer Tomography. No pores>3× the voxel size of 17 microns could be detected. The sintered density of the body was 3.334 g/cm³. The final OD were 15.956 mm compared with the nominal dimensions of the press tool ID of 15.95 mm, which corresponds to an OD increase of 0.04%.

Diffraction data were collected between 15-70 degrees in 2 theta on the top of an sintered and as-blasted insert using a Bruker D8 (Gadds) with CuKα-radiation and a 0.5 mm collimator. The High Score+ software was used for the evaluation (phase identification) and diamond, SiC (β-Moissanite) and Si were found.

TABLE 10

| m green body (g) | m brown body (g) | m sintered (g) | Sintered volume (cm³) | Sintered density Archimedes (g/cm³) |
|---|---|---|---|---|
| 8.530 | 7.803 | 11.207 | 3.358 | 3.334 |

Example 11, Prior Art

Diamond brown bodies from the same batch as in Ex. 1 and brown bodies manufactured as described in Ex. 4 were placed in open hBN-coated high density graphite crucibles with silicon lumps in a large access (200% in weight) are placed in the bottom of the crucible. The crucible was placed in a sinter-HIP furnace and heated with a fast temperature ramp rate, 50° C./min. At about 1420° C. the silicon melted and shortly thereafter it started to infiltrate the body. At 1500° C. argon pressure of 45 bars was applied in order to see if the body could be further densified and the temperature ramping then continued to maximum temperature of 1650° C. The temperature was maintained for about 10 min before the bodies were allowed to cool freely under argon. After sintering the bodies were removed from the crucibles but despite the large access of silicon they were not fully infiltrated and the top of the inserts had been converted into graphite and were completely removed during the SiC-grit blasting process.

Example 12, Abrasion Wear Testing—Diamond Green Bodies with DPSD 1—Invention Versus Prior Art In the wear test the sample tips are worn against a rotating granite log counter surface in a turning operation. In the test the load applied to each insert was 200 N, the rotational speed was 270 rpm and the horizontal feed rate was 0.339 mm/rev. The sliding distance in each test was fixed to 230 m. Each sample was carefully weighed prior and after the test. Sample volume loss was calculated from measured mass loss and sample density and serves as a measurement of wear.

All samples in the test had exactly the same diamond grain size distribution DSPD 1, relative diamond density in the green body (60%) and geometry. Samples were sintered according to the invention (Ex. 1 and 7) and prior art (Ex. 9). The abrasion wear test clearly shows a significantly increased wear resistance for the near net bodies produced according to the invention compared to the near net bodies produced in accordance with prior art.

TABLE 11

| Description Inserts from Ex. 1 (1125 Bar), Sample No. | Wear loss (mg) | Sintered density (g/cm$^3$) | Wear loss (mm$^3$) |
|---|---|---|---|
| Invention 1 | 0.1 | 3.5 | 0.03 |
| 2 | 0.2 | 3.509 | 0.06 |
| 3 | 0.3 | 3.501 | 0.09 |
| Inserts from Ex. 7 (150 Bar), Sample No. | | | |
| Invention 1 | 0.4 | 3.513 | 0.11 |
| 2 | 0.3 | 3.510 | 0.09 |
| Inserts from Ex 8 (150 Bar, pre-CIP) Sample No. | | | |
| Invention 1 | 0.4 | 3.510 | 0.11 |
| 2 | 0.2 | 5.502 | 0.06 |
| Inserts from Ex. 9 Sample No. | | | |
| Prior art 1 | 1.0 | 3.299 | 0.30 |
| 2 | 0.9 | 3.303 | 0.27 |
| 3 | 1.1 | 3.305 | 0.33 |

Example 13—Abrasion Wear Test—Diamond PSD 2 and Ti$_3$SiC$_2$ Addition

All samples in the test had exactly the same diamond grain size distribution DSPD 2 and sample geometry, but different relative diamond density in the green body. The green bodies from Ex. 6, had only 55% relative diamond density compared with 66% for the Prior art green bodies in Ex. 10. The green bodies from Ex. 6 also contained 18 wt % Ti$_3$SiC$_2$.

The relative diamond density in percentage was calculated as the mass of diamonds in the green body (organic binders and other additions excluded) divided by the volume of the green body divided by the X-ray density of diamonds (3.52 g/cm$^3$) multiplied by 100. Samples from Ex. 6 were sintered according to the invention and samples in Ex. 10 according to prior art.

TABLE 12

| Description Inserts from Ex. 6 Sample No. | Wear loss (mg) | Sintered density (g/cm$^3$) | Wear loss (mm$^3$) |
|---|---|---|---|
| Invention 1 | 0.1 | 3.593 | 0.03 |
| 2 | 0.4 | 3.593 | 0.11 |
| 3 | 0.5 | 3.600 | 0.14 |

TABLE 12-continued

| Inserts from Ex. 10 Sample No. | | | |
|---|---|---|---|
| Prior art 1 | 0.8 | 3.331 | 0.24 |
| 2 | 0.7 | 3.332 | 0.21 |
| 3 | 1.0 | 3.325 | 0.30 |

Example 14—Toughness Testing

A toughness test was performed by a single point mechanical cutting in sandstone blocks by progressively applying more aggressive cutting conditions by increasing the depth of cut (DOC). The geometry of all inserts was the same and is shown in FIG. 2, but the diameters of the inserts according to the invention were slightly smaller than the diameters of the inserts manufactured according to prior art. Each insert was mounted for testing by shrink fitting into a steel tool body, giving a cutting pick. The mechanical properties of this sandstone block were: unconfined compressive strength (UCS) of about 120 MPa, unconfined tensile strength (UTS) of about 9.5 MPa, and Cerchar Abrasivity Index (CAI) of about 3.7. The point attack angle of the tool was 55 degrees and the line spacing was 2×DOC (in mm). By increasing the depth of cut after a fixed number of cutting planes by 2 mm in DOC the passive and bending forces on the pick increased. The test was stopped when the insert failed. All inserts, except those marked with a ">" were tested until failure (insert breakage). The inserts marked with a ">" was stopped after finished all cuts at that DOC, but are still intact.

TABLE 13

| Sample | Description Sintered inserts from Ex. 3, Sample No. | Depth of cut at insert failure (mm) |
|---|---|---|
| Invention | 1 | 14 |
| | 2 | >14 |
| | 3 | 16 |
| | 4 | 12 |
| | Sintered inserts from Ex 4, Sample No. | |
| Invention | 1 | >14 |
| | 2 | 14 |
| | 3 | 14 |
| | Sintered insert as described in Ex 1. | |
| Invention | 1 | 14 |
| | 2 | 14 |
| | 3 | 14 |
| | 4 | 14 |
| | Sintered insert from Ex. 9, Sample No. | |
| Prior art | 1 | 12 |
| | Sintered inserts from Ex. 10, Sample No. | |
| Prior art | 1 | 12 |
| | 2 | 12 |

The results show a clear increase in toughness of for the inserts produced according to the invention compared with the inserts produced according to prior art.

Example 15—Diamond Content in Sintered Inserts

The diamond content in the sample tips were determined using image analysis of SEM micrographs showing a representative cross section area of the insert tip. Sintered inserts were prepared by careful mechanical polishing of the insert tip to a depth of ~2 mm below the top, final polishing step was done with 1 μm diamond paste. High resolution SEM micrographs were taken in the backscatter electron mode, magnification 500×, high voltage 10 kV and working distance~8 mm. In the micrographs, diamonds appears as black grains which easily can be separated from the lighter matrix. Image analysis was done with software AxioVision SE64 Re1.4.9, to evaluate the area of all diamonds in the cross section. The grey scale thresholds defining which pixels shall be identified as diamond were set manually to give a good distinction between diamond and matrix. Results are presented as area % diamonds (total area of the micrograph identified as diamond phase in percentage of total micrograph area).

The results, see table 13A, clearly show that the diamond content after sintering according to the invention is significantly higher compared to the prior art infiltration method suitable for mass production of near net shape bodies.

TABLE 13A

| | Description | Diamond PSD in green body | Average rel. diamond density in the green body (%) | Area % of diamond in the sintered material |
|---|---|---|---|---|
| Invention | Sample from ex. 7 | DPSD1 | 60 | 45.2 |
| Invention | Sample from ex. 8 | DPSD1 | 60 | 47.3 |
| Invention | Sample from ex. 1 | DPSD1 | 60 | 46.6 |
| Prior art | Sample from ex. 9 | DPSD1 | 60 | 39.6 |
| Invention | Sample from ex. 4 | DPSD2 | 66 | 52.2 |
| Prior art | Sample from ex. 10 | DPSD2 | 66 | 40.5 |

Example 16, Prior Art—Low Pressure Sintering—Infiltration of in Vacuum at 1650° C.

A brown bodies from the same batch as in Ex. 6 (82 wt % diamond and 18 wt % $Ti_3SiC_2$) were placed in hBN-coated graphite crucible with silicon lumps in a large access (200% in weight) placed in the bottom of the crucible. The silicon used was Silicon 99 Refined-Si 30 015 from Elkem with a silicon content of 99.4 wt % and oxygen content of 0.004% analyzed by LECO and a with a particle size of 10-100 mm. The infiltration was performed under vacuum to the maximum temperature of 1650° C. as has been described in U.S. Pat. No. 7,008,672 B2. A fast temperature ramping, 50° C./min, was applied above 1000° C. to prevent extensive graphitization (>/=50 wt %) of the diamonds prior to Si-infiltration. The temperature was maintained for about 10 minutes and the samples were than cooled down freely. The excess silicon was removed by SiC-grit blasting and a small part of the bottom was heavily reacted and craters had formed. The body inspected by Computer Tomography according to the description in example 1. The sintered body was essential free from porosity and looked fully infiltrated, but showed the presence of healed cracks with the length of several mm. The sintered density of the body was 3.390 g/cm³.

TABLE 14

| m brown body (g) | m sintered (g) | Sintered volume (cm³) | Sintered density Archimedes (g/cm) |
|---|---|---|---|
| 8.213 | 11.507 | 3.391 | 3.390 |

Example 17—Diamond Particle Size Distribution in the Sintered Parts

Figure 3:
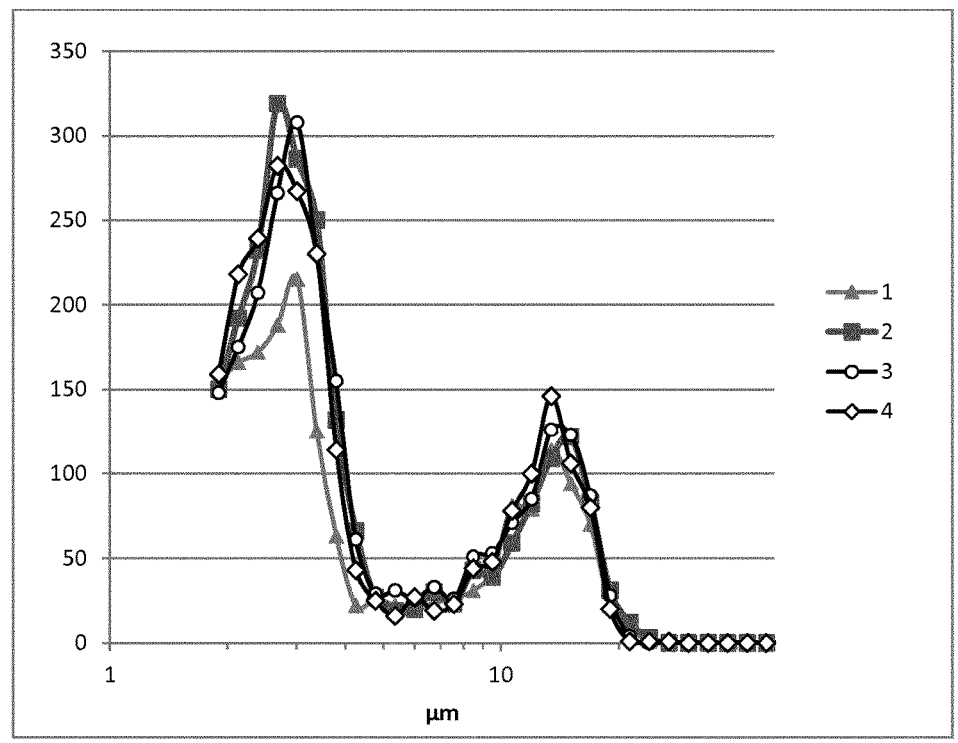
FIG. 3. discloses particle size distribution given as the equivalent circle diameter of diamond particles in 2D-cross sections of sintered materials according to the invention and according to prior art. The number of particles is given on the y-axis and equivalent circle diameter in μm is given on the x-axis. Sample 1 is the prior art material described in example 9 and sample 2, 3 and 4 are materials according to the invention as described in example 1, 8 and 7 respectively.
Figure 4:
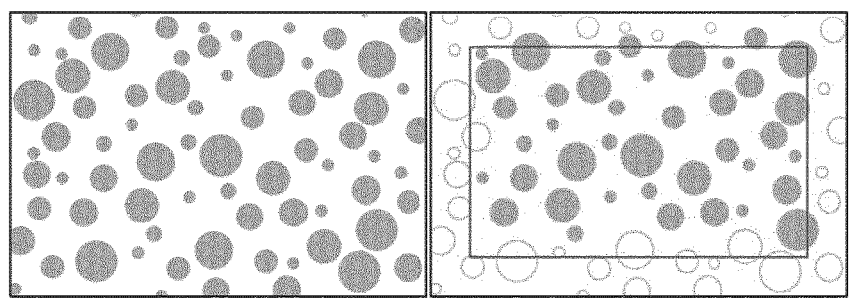
FIG. 4 shows schematic images illustrating which diamond particles that have been included/excluded within the area of analysis for each micrograph. Filled particles are included and non-filled particles are excluded from the analysis and all diamond particles are regarded as spherical.
Figure 5:
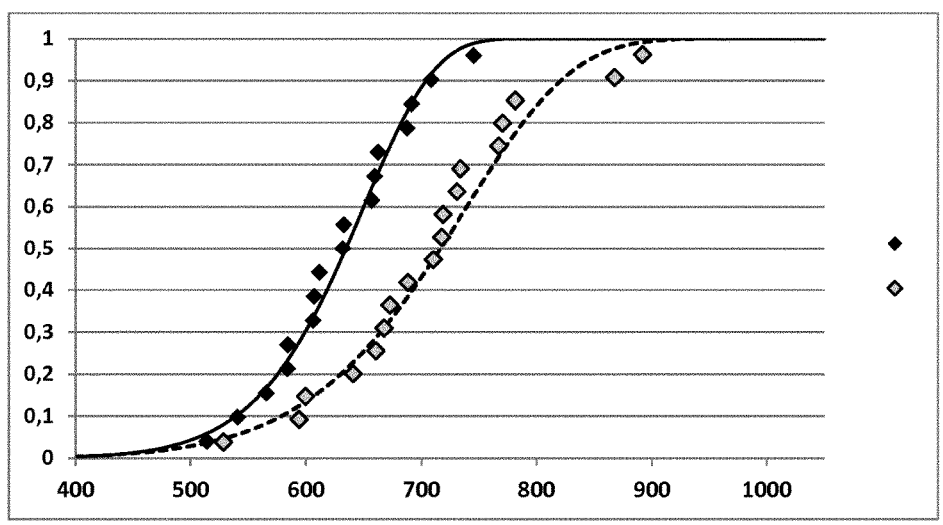
FIG. 5 shows the cumulative probability of failure on the y-axis is plotted as a function of the measured B3B characteristic strength in MPa on the x-axis. Measured data from the prior art material as described in example 9 are shown as black diamonds and the measured data from the material according to the invention in example 1 are shown as light grey diamonds. The Weibull distribution function calculated from the experimental data for the material produced according to prior art is shown as a black solid line and the corresponding distribution curve for the material produced according to the invention is shown as a dashed black line.

The diamond particle size distribution (DPSD) in the sintered material was evaluated with image analysis of SEM micrographs. Sample preparation, SEM settings and used software are described in Example 15. Regions of the diamond phase were identified according to same grey scale threshold values as in Example 15. The area of each diamond particle cross section and equivalent circle diameters (ECD) (i.e. the diameter of a circle with the same area) are calculated and used to plot diamond particle size distribution for the invention versus prior art, see FIG. 3. To eliminate the effect of half particles cut by the micrograph frame, the DPSD analysis areas are slightly smaller than the micrograph and particles of two sides are included in the analysis, and particles on two opposite sides are totally excluded from the analysis, se schematic images in FIG. 4. It should be noted that reported particle diameters are valid for random two dimensional cross sections of the particles, and is not a true diameter of the three dimensional particle. All identified diamond particles with a minimum area of 2.5 μm² (ECD of 1.79 μm) were included in the particle size analysis. Adjacent diamonds were sometimes first identified as the one particle and this was corrected manually by splitting it into correct number of particles.

The total number (summed) of diamonds in the finest size fractions (ECD of 2-4 μm), see table 15, clearly differs between the material sintered according to the invention and the material sintered according to prior art (example 9).

TABLE 15

| | Description | Diamond PSD in green body | No. of detected diamond particles with ECD 2-4 μm | Percentage of 2-4 μm diamond particles in relation to prior art (%) |
|---|---|---|---|---|
| Invention | Sample from ex. 7 | DPSD1 | 1350 | 145 |
| Invention | Sample from ex. 8 | DPSD1 | 1341 | 144 |
| Invention | Sample from ex. 1 | DPSD1 | 1409 | 152 |
| Prior art | Sample from ex. 9 | DPSD1 | 929 | 100 |

In the prior art material from Ex. 9 many of the small diamonds in the raw material have been consumed during the sintering process, but with the invented method significantly more of the small diamonds remained in the sintered structure thus yielding a higher sintered diamond density. In the presented examples of invention there are 44 to 52% more diamonds with equivalent circle diameter 2-4 µm, compared to the prior art material from Ex. 9.

Depending on the DPSD in the raw material the finest diamond fraction will vary in both average size and distribution. In the sintered material the number of diamond particles measured by images analysis as above is plotted on the y-axis against their ECD-size on a logarithmic scale on the x-axis. The y-axis maximum in the plot (number of diamond particles) is identified and an ECD-size interval (x-axis) ranging from preferable +/−30%, more preferable +/−15%, most preferable +/−10% around the maximum is selected and all particles within this interval is counted and called Number of Fines (NF). NF should be preferable >15%, more preferable >25% and most preferable >35% higher compared to the NF of the sintered prior art material when starting from the same DPSD in the raw material.

Example 18 Biaxial Strength Determination

In order to further show the benefits of the material according to the present invention, the biaxial strength using the "Ball in three balls" (B3B) method, of the material from Ex 1 (DPSD1) and the prior art material in Ex 9 (DPSD1) were determined using the B3B-method (ref below). The method is used to characterize a material property similar to transverse rupture strength (TRS), but under biaxial loading—the so called B3B characteristic strength.

Thin discs (about 16 mm in diameter and 2.5 mm in thickness) were pressed and sintered according to the manufacturing route in Ex 1 and Ex. 9, respectively. After sintering the discs were etched (as described earlier) to remove the access Si, then ground to ensure flatness and polished on the prospective tensile side to obtain a mirror like surface. The dimensions of the discs after sintering and polishing were about 15.8 mm in OD and 2.1 mm in thickness for the samples manufactured according to Ex 1. (invention) and about 16.4 mm in OD with a thickness of about 2.2 mm for the samples manufactured according to Ex. 9 (prior art).

In the B3B test, 18 discs of material according to Ex. 1 and 17 discs of the material according to Ex. 9 were included and the measurement was performed using an Instron 5980 test frame equipped with a 50 kN load cell. The B3B-fixtures were provided by Montana Universitat Leoben, Austria. In the tests four steel balls, one loading ball and three supporting balls of 12.303 mm in diameter, were used and the set up and test procedure were performed exactly as described in "Practical guide to Ball-on-tree-balls (B3B-) testing" from 20141001 by T. Lube, W. Harrer and P. Supanicic. The testing was carried out in displacement control, with a crosshead displacement rate of 0.6 mm/min. The calculation of the stress values from the measured fracture loads was carried out by FEM, using the applet at http://www.isfk.at/de/960/ (see also A. Börger, P. Supancic, R. Danzer: The Ball on three Balls Test for Strength Testing of Brittle Discs—Stress Distribution in the Disc. *Journal of the European Ceramic Society* 22 (2002) 1425-1436, doi:10.1016/S0955-2219(01)00458-7). Weibull analysis of the test data was then conducted in order to evaluate the B3B characteristic strength as well as the Weibull modulus for both materials (see Table 16 below).

TABLE 16

|  | Ex. 1 (Invention) | Ex. 9 (Prior art) |
|---|---|---|
| B3B characteristic strength* | 747 MPa | 656 MPa |
| Weibull modulus | 9 | 12 |
| No of samples | 18 | 17 |

*The given B3B strength values were obtained as the so called scale parameter of the Weibull distribution, i.e. the strength corresponding to 63.2% failure probability.

The results presented in table 16 show that the strength of the material obtained according to the invention is significantly higher than that of the prior art material.

The invention claimed is:

1. A method of producing a component of a composite of diamond having a diamond content of ≥25 vol % and a binder, wherein a Hot Isostatic gas Pressure process (HIP) is used, comprising the steps of:
    forming a de-bound green body having a diamond content of solids of at least 50 vol %;
    enclosing said de-bound green body and an infiltrant in a Zr-capsule that comprises zirconium as a main constituent and sealing the Zr-capsule; and
    applying a predetermined pressure-temperature cycle on a unit formed by said de-bound green body, infiltrant and capsule in which the infiltrant infiltrates the de-bound green body and the de-bound green body is further densified such that a volume thereof is decreased, wherein the predetermined pressure-temperature cycle includes a temperature and pressure increase, with or without holding times, until a predetermined maximum temperature being between 1450 to 1600° C. and a predetermined maximum pressure being between 50 to 3000 Bar is reached.

2. The method according to claim 1, wherein the predetermined pressure-temperature cycle includes a first step in which the temperature is increased to a temperature between 1100 to 1361° C.

3. The method according to claim 1, wherein, in a second step, a pressure of the unit is increased to a level of at least 40% of the predetermined maximum pressure to be applied during said pressure-temperature cycle, and not until after said pressure has been reached, the temperature is increased to the predetermined maximum temperature.

4. The method according to claim 1, wherein, when Si is the infiltrant, the time above 1541° C. in the predetermined pressure-temperature cycle should be less than 7 minutes.

5. The method according to claim 1, wherein the step forming of a de-bound green body includes partially removing a temporary binder from the green body by subjecting the green body to an elevated temperature.

6. The method according to claim 5, wherein the elevated temperature is >200° C. but <600° C.

7. The method according to claim 5, wherein 90 to 95 weight % of the temporary binder is removed.

8. The method according to claim 1, wherein the diamond particles have a particle size in the range of 2-200 microns.

9. The method according to claim 1, wherein the infiltrant enlosing the de-bound green body includes a densely packed powder and/or granules with bi-modual or multi-modual particle size distribution or as a dense replica of brown bodies and the capsule, where the density of the infiltrant in the capsule prior to sintering is >30% of a theoretical sintered density.

10. The method according to claim 1, wherein the infiltrant comprises Si as a main constituent.

11. The method according to claim 1, wherein the green body is subjected to a Cold Isostatic Pressing step prior to de-binding.

12. The method according to claim 1, wherein the pre-determined pressure-temperature cycle includes increasing the pressure to a pressure being between 35 to 45 Bar, after which the temperature is increased to a temperature being between 1250 to 1350° C., keeping the temperature constant for a period of between 40 to 60 minutes during which the pressure is increased to the range of 950 to 1050 Bar, after which both the temperature and pressure are further increased to the range of 1550 to 1570° C. and 950 to 1150 Bar respectively.

13. A diamond composite having a diamond content of ≥25 vol % made according to the method of claim 1.

14. The diamond composite according to claim 13, wherein an area % of diamond in the diamond composite is above 40.

15. The diamond composite according to claim 13, wherein the Zr-content in the diamond composite is between 1.5 to 8.5 wt %.

\* \* \* \* \*